Nov. 20, 1945.   L. McCULLOCH   2,389,380
DRYING AGENTS OR DESICCANTS
Filed Feb. 5, 1943
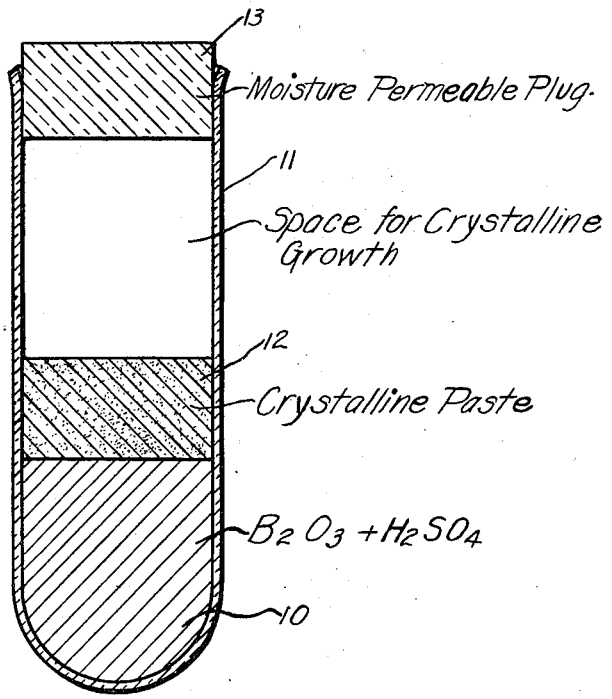
WITNESSES:
INVENTOR
Leon McCulloch.
BY
ATTORNEY Patented Nov. 20, 1945

2,389,380

UNITED STATES PATENT OFFICE 2,389,380

DRYING AGENTS OR DESICCANTS

Leon McCulloch, Pittsburgh 6, Pa., assignor to Westinghouse Electric Corporation, East Pittsburgh, Pa., a corporation of Pennsylvania Application February 5, 1943, Serial No. 474,879

3 Claims. (Cl. 252—194)

The invention relates generally to drying agents or desiccants and, more particularly, to drying agents for use with deliquescent chemicals, explosives, drugs, and delicate instruments, etc.

Heretofore, many drying agents have been employed but they all have many shortcomings. Sulphuric acid, which is a common desiccant in the chemical field, is very corrosive and sometimes dangerous if spilled. Further, its drying power decreases as it takes up water. Other drying agents such as the porous solids alumina, silica gel, and charcoal and the hygroscopic salts such as, for example, calcium chloride lack constancy in their drying power. Therefore, there is a need for a drying agent or desiccant which does not have these objectionable characteristics.

The object of the present invention is to provide a drying agent or desiccant which may be readily handled and which possesses a substantially constant drying capacity.

For a fuller understanding of the nature and objects of the invention, reference may be had to the following detailed description taken in conjunction with the accompanying drawing, the single figure of which is a diagrammatic view showing how the drying agent of this invention may be prepared for general use.

It has been found that boric oxide can take up 77% of its weight or 135% of its volume of water in the formation of boric acid. This would suggest that boric oxide is a good drying agent of itself. However, when boric oxide is used as a drying agent under ordinary conditions a surface film or coating is formed which renders it practically inert to atmospheric moisture.

I have discovered that by wetting the boric oxide with sulphuric acid the film is dissolved and the boric oxide becomes a good drying agent and retains that characteristic until the whole of the oxide is converted to a hydrated form. The boric oxide in changing over to a hydrated form retains its affinity for moisture so that its capacity for taking up moisture remains substantially constant.

It has also been discovered that sulphuric acid will dissolve boric oxide and drying agents or desiccants prepared by dissolving boric oxide in sulphuric acid take on a number of different forms depending upon the amount of each ingredient employed in making the mixture. A table which will be given hereinafter indicates the proportions of the ingredients which may be employed to make the desiccant in its different forms.

In preparing the drying agents boric acid may be added to sulphuric acid and heated to expel water. The table reveals that when from traces to 40% boric acid is mixed with substantially 100% to 60% sulphuric acid the resultant mixture is either a fluid or semi fluid at room temperature. When these fluids or semi fluids are hydrated they produce a thin acid solution which will flow. When the mixture is utilized as a desiccant, the container in which it is stored can be provided with a small drain that will take off the acid produced by hydration.

When the mixture contains from 60% to 50% boric acid and from 40% to 50% sulphuric acid the product is a very viscous fluid. When mixtures of this type are hydrated they form a non-dripping solid.

A mixture of 70% boric acid and 30% sulphuric acid give a slightly plastic glass. A drying agent or desiccant of this type is a very convenient product to handle.

Drying agents made from 80% to substantially 100% boric acid and from 20% to traces of sulphuric acid are hard brittle glasses at room temperature. While mixtures employing below 5% sulphuric acid have some drying capacity it is not thought that commercial results can be obtained by using less than 5 parts by weight of sulphuric acid with 95 parts by weight of boric acid.

In order to give some idea of what has been done in the preparation of drying agents in accordance with this invention 75% to 80% of boric acid ($H_3BO_3$) have been mixed with 25% to 20% of sulphuric acid ($H_2SO_4$) and heated at temperatures of about 250° C. to drive off the water. The product of these mixtures was a glass-like material that could be broken into fragments and stored at room temperature with very little sticking of the pieces to one another. Investigation also revealed that this desiccant, while it contained sulphuric acid, could be handled in the fingers or even be placed on the tongue without injury. In addition to its safety the glass-like material was a powerful drying agent having capacity to take water away from a saturated solution of potassium hydroxide leaving only a dry residue.

It has been demonstrated that the desiccant can be made in many ways. The simplest method is merely by wetting boric oxide ($B_2O_3$) with sulphuric acid. The sulphuric acid prevents the forming of a surface film on the boric oxide and the product has great capacity for absorbing moisture.

Crystalline boric oxide which may have acquired a surface film may be wetted or moistened with sulphuric acid and the surface film will disappear. This crystalline material then has great affinity for moisture.

The boric oxide may be dissolved in sulphuric acid to form a glass-like material. For many purposes this solid glass-like material is very desirable since it can be readily handled and stored.

It has also been established that boric oxide ($B_2O_3$) may be crystallized from a melt of sulphuric acid and boric acid either by adding crystals of boric oxide or by stirring. In this crystalline form the product has great affinity for moisture. In this connection it is noted that if it is desired to obtain the desiccant in clear glass-like form the melt of sulphuric acid and boric acid must not be stirred nor crystals added.

In order to give a clearer conception of the capacity of this desiccant to absorb moisture, tests have been made on a large number of mixtures. These mixtures were exposed to the atmosphere for 7 days during which time they were weighed each day. However, in the interest of simplicity in the table, the weights found on the 7th day only will be given.

In preparing the drying agents for the test mixtures of boric acid and sulphuric acid, they were prepared and fused at 250° C. In making the fusions the mixtures of boric acid and sulphuric acid in loosely covered test tubes were subjected to a temperature of about 250° C. until the liquid became quiescent. This took about three hours. They were then cooled to room temperature.

In order to determine the capacity of the different mixtures to absorb moisture, twenty grams of each was placed in separate 50 cubic centimeter beakers 1.5 inches in diameter thus exposing 1.75 square inches of surface in each beaker to the atmosphere. In order to get the surfaces of the mixtures and beakers level they were subjected to fusing temperatures.

The results obtained by weighing the beakers each day indicated that the mixtures were constant in their capacity for absorbing moisture. The weight given in the table following is for the 7th day and gives the relative capacity of the different mixtures to absorb moisture.

The following table gives the mixtures tested and the results obtained:

| $H_3BO_3$ | $H_2SO_4$ | Percent water absorbed in seven days | |
|---|---|---|---|
| 0 | 100 | 39.3 | These five mixtures are fluid or semi-fluid at room temperature and when hydrated they liberate a thin acid solution which may be drained off. |
| 10 | 90 | 39.9 | |
| 20 | 80 | 40.1 | |
| 30 | 70 | 34.6 | |
| 40 | 60 | 24.4 | |
| 50 | 50 | 21.9 | These two mixtures are viscous fluids at room temperature and when hydrated they form a non-dripping solid. |
| 60 | 40 | 13.7 | |
| 70 | 30 | 13.0 | This single mixture was a slightly plastic glass at room temperature. |
| 80 | 20 | 15.6 | The last seven mixtures were hard brittle glasses at room temperature. |
| 90 | 10 | 13.0 | |
| 95 | 5 | 12.5 | |
| 98 | 2 | ---- | |
| 99 | 1 | 3.8 | |
| 99.6 | 0.4 | 2.7 | |
| 100 | 0 | 0.1 | |

The mixtures covering the range of from 50 to 95 parts by weight boric acid and 50 to 5 parts by weight sulphuric acid are solid glass-like materials which are very desirable for most commercial purposes. They may be readily handled and stored. While the foregoing mixtures may retain a few percent of water, the anhydrous compounds of crystalline boric oxide, a solution of boric oxide and sulphuric acid, can be made by stirring these while at a temperature of around 250° C. with or without adding seed crystals until crystallization is completed. These anhydrous compounds can absorb a little more water than the mixtures of boric acid and sulphuric acid given in the table. However, the added effort in preparing such anhydrous compounds is not always warranted.

It is to be understood that in preparing this application boric oxide and boric acid are considered substantially the same, both may be used in accordance with the disclosure made to prepare the different embodiments of the desiccants or drying agents. If boric acid is used to start with, it will be treated with sulphuric acid first and dehydrated to produce boric oxide as described herein. It is also noted that the boric oxide glass of commerce and the crystalline boric oxide, which has recently appeared, may both be utilized and when moistened with sulphuric acid make good drying agents.

A convenient method of utilizing the desiccant or drying agent described hereinabove is illustrated in the drawing. As shown a predetermined amount of the desiccant illustrated at 10 is placed in a glass capsule 11. The desiccant placed in the capsule will preferably be prepared in solid form from boric oxide and sulphuric acid. A layer of a crystalline paste 12, formed as the desiccant absorbs moisture is illustrated. There is also a space shown which will permit the desiccant to expand as it absorbs moisture. A closure or stopper 13 made from some suitable porous material such as a coarse porcelain is provided so that the desiccant will not be spilled out of the capsule. The moisture will readily be drawn through the porous stopper. This makes a convenient embodiment of the invention for use in laboratories where it may be employed to protect delicate instruments, explosive bombs and the like.

Since different embodiments of the invention may be made without departing from the scope thereof, it is intended that all matter contained in the above description shall be interpreted as illustrative and not in a limiting sense.

I claim as my invention:

1. A drying agent consisting of 95 to 5 parts by weight of boric oxide treated with from 5 to 95 parts by weight of sulphuric acid.

2. A substantially solid drying agent consisting of from 95 to 50 parts by weight of boric oxide and from 5 to 50 parts by weight of sulphuric acid.

3. A drying agent consisting of boric oxide and sufficient sulphuric acid to wet the boric oxide to prevent the forming of a surface film on the boric oxide when exposed to moisture.

LEON McCULLOCH.